United States Patent
Sun

[11] Patent Number: 5,947,879
[45] Date of Patent: Sep. 7, 1999

[54] DEVICE FOR CONTROLLING A TOOL SHAFT OF A CUTTING MACHINE

[76] Inventor: Ho Wei Sun, No. 19, Alley 28, Lane 851, Chung Shan Road, Shgen Kang Hsiang, Taichung Hsien, Taiwan

[21] Appl. No.: 09/085,645

[22] Filed: May 27, 1998

[30] Foreign Application Priority Data

Sep. 2, 1997 [TW] Taiwan ................................ 86214952

[51] Int. Cl.⁶ ................................................ B23Q 3/157
[52] U.S. Cl. .............................. 483/44; 414/736; 483/38
[58] Field of Search .......................... 483/38, 39, 44, 483/41, 45, 49, 42; 414/736

[56] References Cited

U.S. PATENT DOCUMENTS

| | | | |
|---|---|---|---|
| 3,760,958 | 9/1973 | Lohneis | 483/44 X |
| 3,786,938 | 1/1974 | Kirkham | 483/44 X |
| 3,886,652 | 6/1975 | Roubloff et al. | 483/44 |
| 4,072,236 | 2/1978 | Nomura et al. | 483/44 X |
| 4,091,526 | 5/1978 | Nakaso et al. | 483/44 |
| 4,399,603 | 8/1983 | Reed | 483/38 |
| 4,419,806 | 12/1983 | Esser | 483/44 |

FOREIGN PATENT DOCUMENTS 27638  2/1982  Japan ..................................... 483/44

*Primary Examiner*—William Briggs
*Attorney, Agent, or Firm*—Bacon & Thomas

[57] ABSTRACT

A device for controlling a tool shaft of a cutting machine includes a casing in which the tool shaft is rotatably and movably received therein, the casing having a first and a second detection member, a first, a second and a third switch member respectively thereto, two racks selectably engaged with a toothed section of the tool shaft and each of the two racks having a damping device disposed therein. The tool shaft has head portion connected to a cylinder and the head portion has two rods extending therefrom. When the first rod is detected by the first detection member, and the head portion actuates the first switch member and one of the racks rotates the tool shaft till the second rod is detected by the second detection member so as to lower the tool shaft. The other rack is therefore engaged with and rotates the tool shaft till the damping device in the rack actuates the third switch member to raise the tool shaft to let the first rod be detected by the first detection member.

3 Claims, 5 Drawing Sheets

DEVICE FOR CONTROLLING A TOOL SHAFT OF A CUTTING MACHINE

FIELD OF THE INVENTION

The present invention relates to a device for controlling a rotational and linear movement of a tool shaft to which tools such as knifes are connected. The device rotate the shaft under a smooth motion so as to avoid any sudden stopping action.

BACKGROUND OF THE INVENTION

A conventional tool shaft for a cutting machine is designed to be engaged with various types of tools or knifes so as to process projects. These tools or knifes are caught by a catching means which catches one of the knifes from a tools frame and shifts the tool it catches to approach the tool shaft so as to add the knife to the tool shaft or to remove a knife already engaged with the tool shaft therefrom. However, the conventional tool shaft is typically actuated by a cylinder so that once the cylinder is actuated, a speed of the cylinder will suddenly increase to a certain value so as to rapidly move the tool shaft. Therefore, when the cylinder is stopped, the movement speed of the tool shaft will be reduced to zero from the high speed the shaft moves. An inertia force will let the knife on the tool shaft tends to disengage from the shaft, this could result in an impact between the tool shaft and the knife. Furthermore, sometimes, the knife could drop from the tool shaft because of the sudden stopping action. Also, the catching means could hit the knife if the knife is not securely engaged with the tool shaft under a condition of the sudden stopping action.

In order to improve the problem, manufacturers use a cam device to actuate the shaft, the cam device makes the tool shaft move along a smooth path so that the sudden stopping action mentioned above can be mitigated. Nevertheless, to achieve a precise curve moving path, a cam member of the cam device has to be manufactured precisely and a high price is incurred. Most of the medium or small size plants cannot afford the cam device so that a suitable device to rotate the tool shaft is needed.

The present invention intends to provide a device for controlling a tool shaft of a cutting machine, wherein the tool shaft is moved and controlled linearly and rotationally by the device so as to have a smooth moving path. By the operation of the device the problems of the conventional tool shaft are mitigated and/or obviated.

SUMMARY OF THE INVENTION

In accordance with one aspect of the present invention, there is provided a device for controlling a tool shaft of a cutting machine, wherein the tool shaft has a toothed section and is actuated by a cylinder. The device comprises a casing mounted to the tool shaft and has a first detection member and a second detection member respectively disposed thereto. A first switch member and a second switch member are respectively disposed to the casing and located lower than the first and the second detection member.

A head portion is fixedly connected to a top of the tool shaft and is connected to the cylinder. A first rod and a second rod respectively extend from the head portion. The first rod and the second rod are located corresponding to the first and the second detection member. A first rack and a second rack are respectively disengagably engaged with the toothed section of the tool shaft, each of the first rack and the second rack having a damping means disposed therein. A third switch member is disposed to the casing and located corresponding to the second rack.

When the first rod is detected by the first detection member and the head portion actuates the first switch member, the first rack rotates the tool shaft till the second rod is detected by the second detection member so as to lower the tool shaft. The second rack is therefore engaged with and rotates the tool shaft till the second damping means in the second rack actuates the third switch member to be adapted to raise the tool shaft to let the first rod be detected by the first detection member.

The present invention provides a device for controlling a tool shaft of a cutting machine, wherein the shaft is operated without sudden movements.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
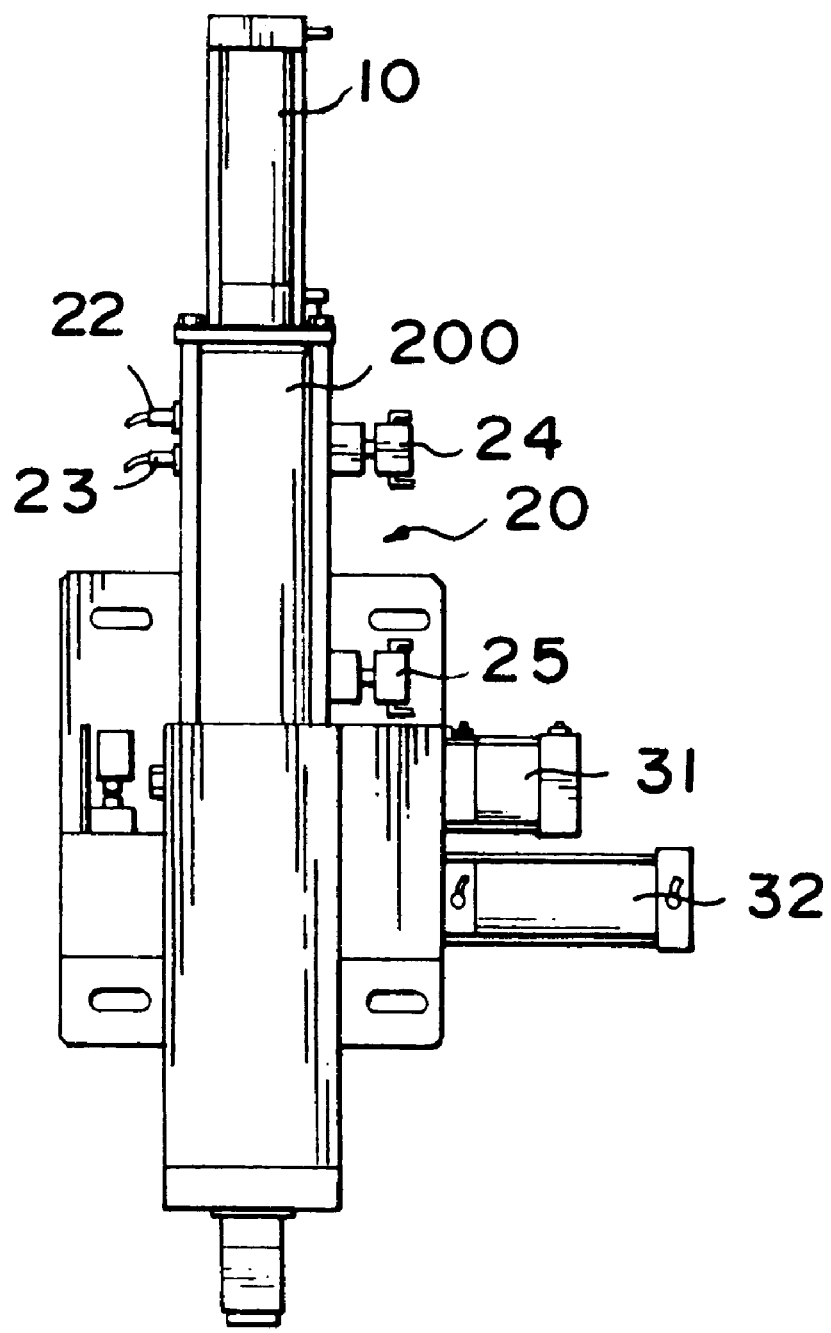
FIG. 1 is an illustrative view to show the device in accordance with the present invention for controlling a tool shaft of a cutting machine.

For a better understanding of the present invention, reference is made to FIGS. 1 through 4, a tool shaft 13 of a cutting machine is actuated by a hydraulic cylinder 10 which is connected to an extension portion 12 of a head portion 14 which is fixedly connected to a top of the tool shaft 13. The tool shaft 13 has a toothed section 130 and is movably and rotatably received in a casing 200. A tool supporting plate 50 (FIG. 5) is transversely disposed to a lower end of the tool shaft 13.

The casing 200 has a flange 21 extending inwardly and radially from a top thereof, the first flange 21 having a plurality of recesses 210 defined in an inner periphery thereof. The extension portion 12 of the head portion 14 has a plurality of protrusions 120 extending radially and outwardly therefrom which are sized to pass through the recesses 210 so that the tool shaft 13 can be raised, and when the tool shaft 13 is rotated an angle, the protrusions 120 are not in alignment with the recesses 210, the tool shaft 13 is rested on the flange 21 and will not drop. The casing 200 has a first detection member 22, a second detection member 23, a first switch member 24 and a second switch member 25 respectively disposed thereto wherein the two switch members 23, 24 are located lower than the first and the second detection member 22, 23. The first switch member 24 and the second switch member 25 respectively have an actuating rod 240/250 biasedly disposed thereto.

The head portion 14 has a first rod 121 and a second rod 122 respectively extending from the head portion 14, wherein the first rod 121 and the second rod 122 are located corresponding to the first and the second detection member 22, 23, and have an angle of 60 degrees defined therebetween so that the first rod 121 and the second rod 122 can be respectively detected by the first detection member 22 and the second detection member 23 when the tool shaft 13 rotates between two positions.

A first rack 33 and a second rack 34 are respectively disengagably engaged with the toothed section 130 of the tool shaft 13 so as to rotate the tool shaft 13. Each of the first rack 33 and the second rack 34 is driven by a cylinder 31/32 corresponding thereto. The first and the second rack 33, 34 each have a longitudinal recess 330 defined therein so that a first and a second damping means are respectively received in the respective longitudinal recesses 330. Each of the first and the second damping means includes a tubular member 41 which is biased by a spring 43 and movably received in the respective longitudinal recesses 330 so that a distal end of each of the tubular members 41 extends beyond the rack 33/34 corresponding thereto. Each of the tubular members 41 has a shoulder portion formed in a periphery defining the longitudinal recess 330 so as to engage with a middle member 44 which is biased by the spring 43. A passage 413 is defined through the distal end of the two tubular members 41 and communicates with the longitudinal recess 330 corresponding thereto. Each of the passages 413 is sealed by a block 46 which is biasedly and movably and biasedly received in the longitudinal recess 330 between the middle member 41 and the distal end of the tubular member 41 corresponding thereto. Each of the tubular members 41 has a tapered outer periphery so as to define a gap 414 between the outer periphery and a periphery defining the longitudinal recess 330 corresponding thereto.

A stop bolt 47 is disposed to the casing 200 and located corresponding to the first rack 33. A third switch member 35 is disposed to the casing 200 and located corresponding to the second rack 34.

Figure 2:
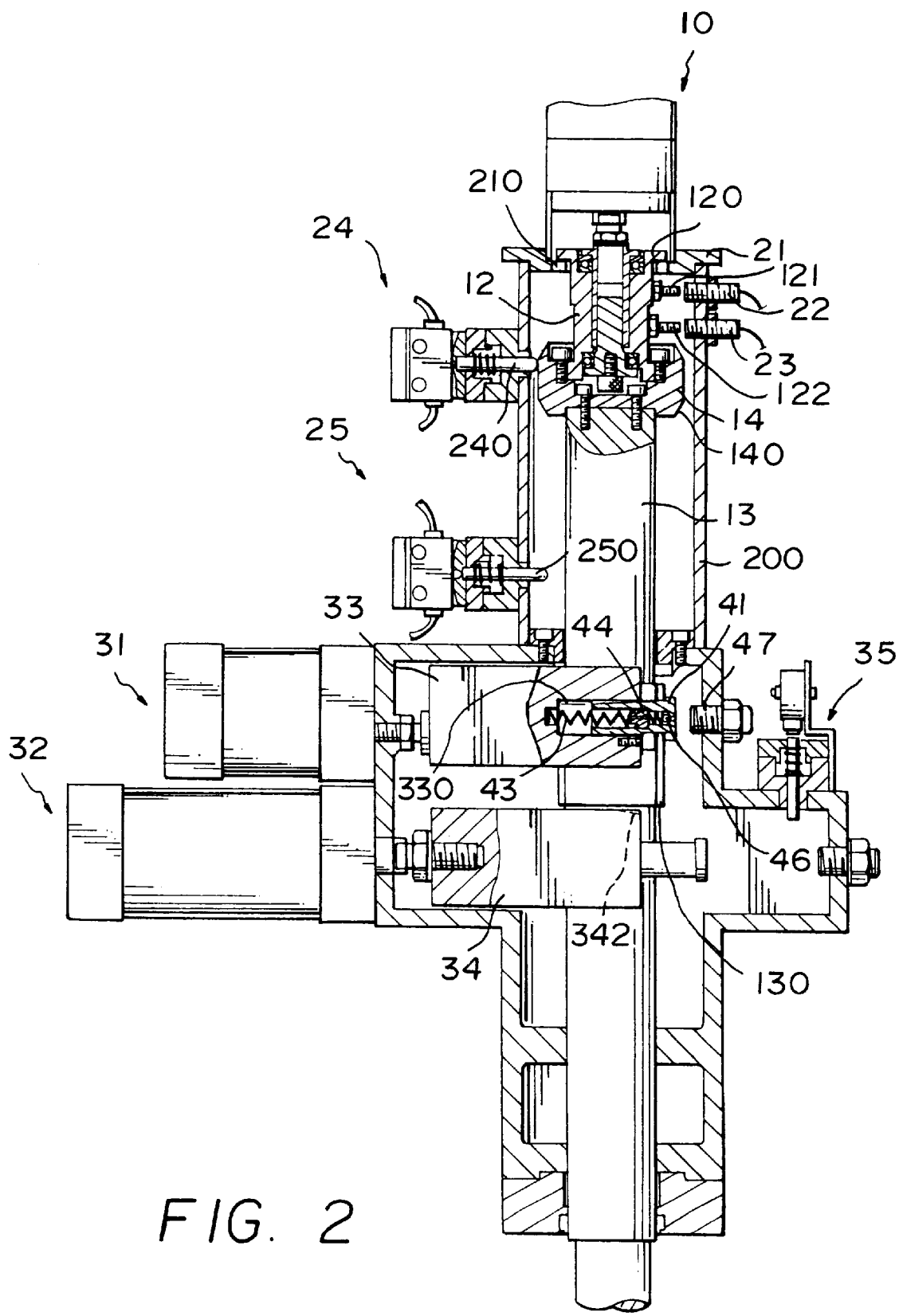
FIG. 2 is a side elevational view, partly in section, of the device in accordance with the present invention, when the tool shaft is not yet lowered.
Figure 3:
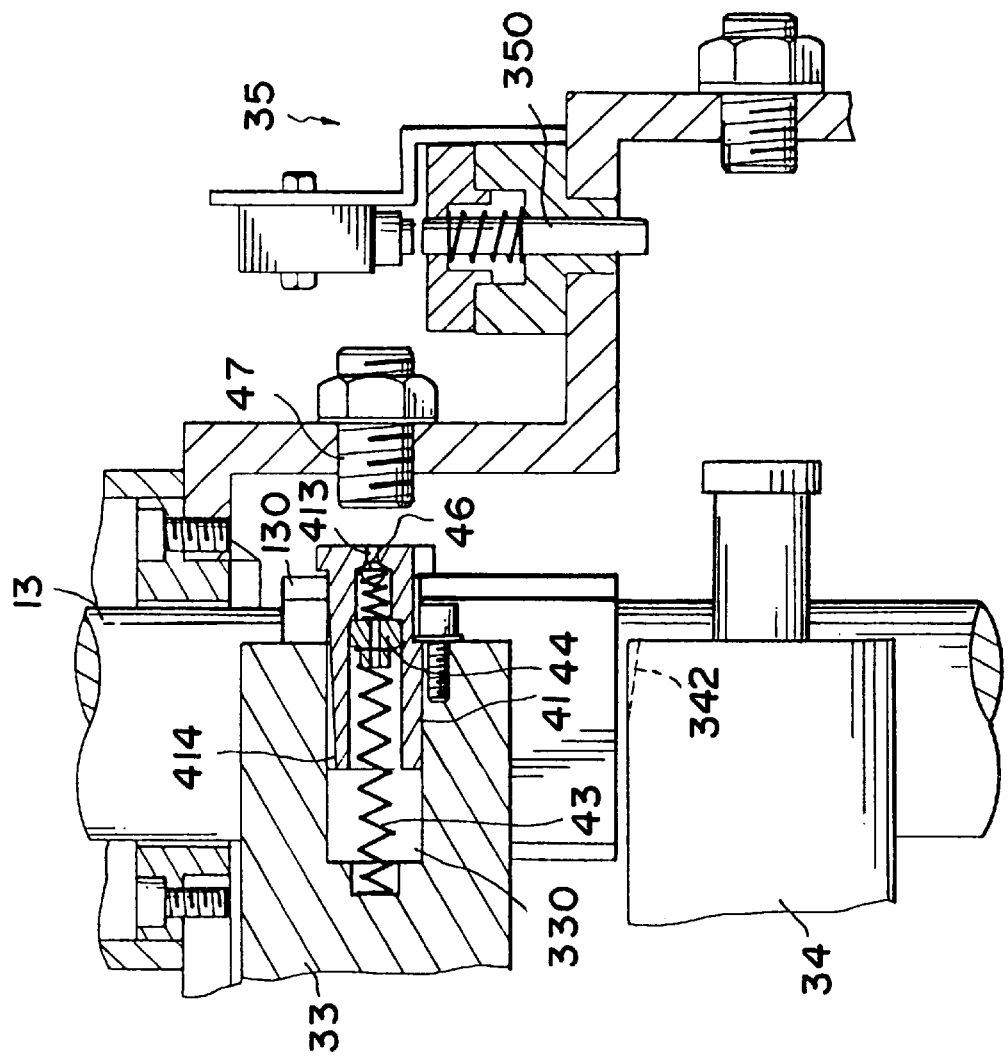
FIG. 3 is a fragmentary view, partly in section, of the a damping means received in the rack of the device in accordance with the present invention.
Figure 4:
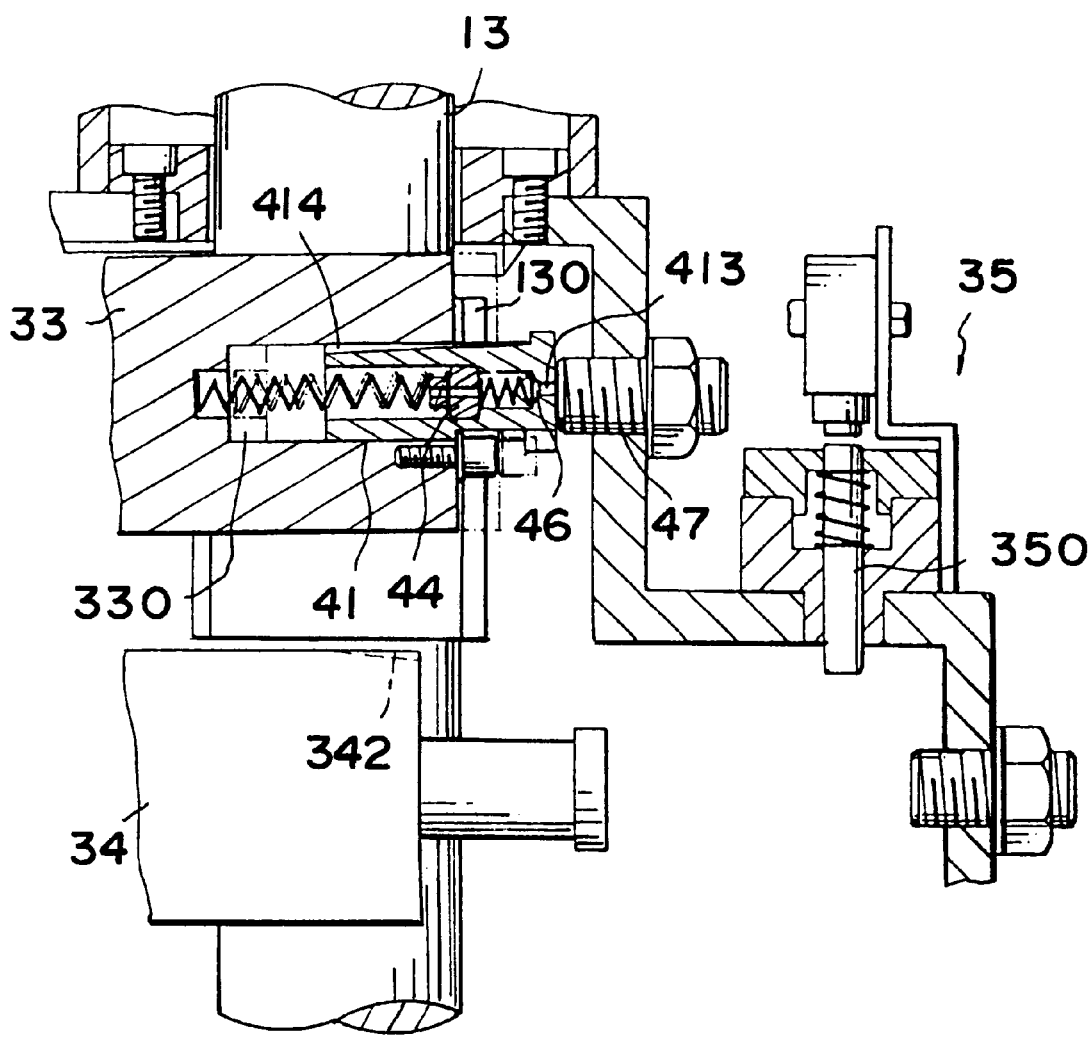
FIG. 4 is a view similar to FIG. 3 wherein the rack moves and the damping means thereof contacts a stop bolt.
Figure 5:
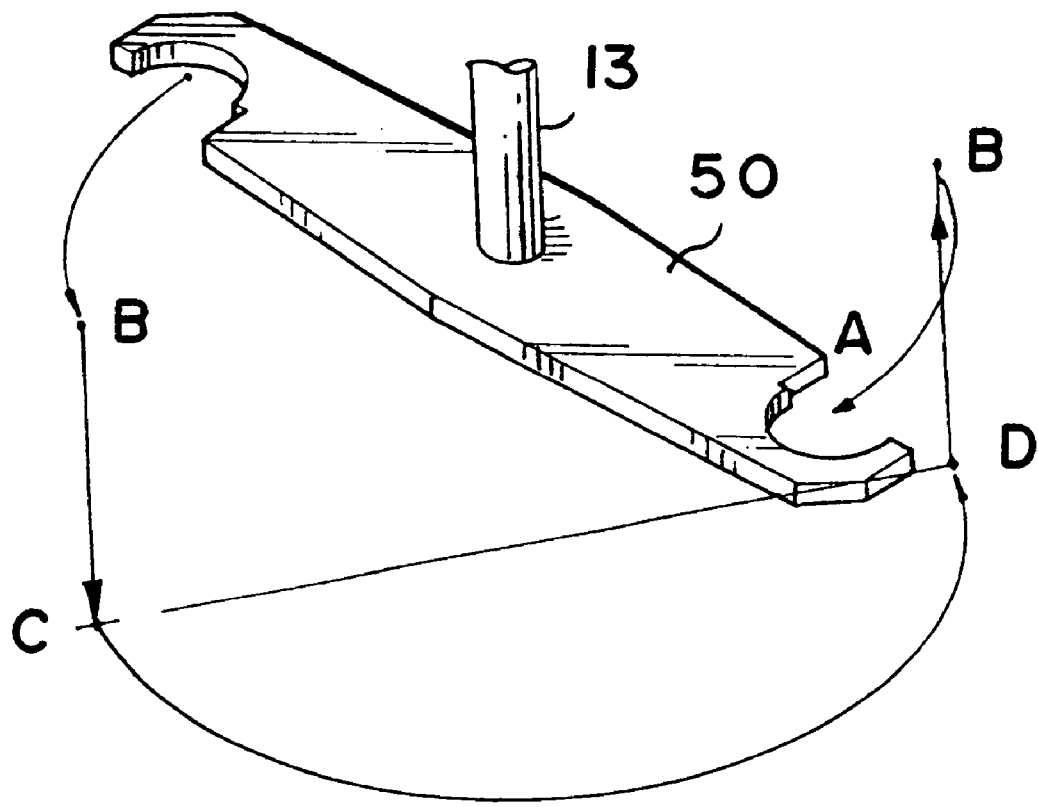
FIG. 5 is an illustrative view to show a various positions of a tool supporting plate connected to the tool shaft.

Referring to FIG. 5, when the tool shaft 13 is positioned at a position as shown in FIG. 2, a first end of the tool supporting plate 50 is located at position A. The first rod 121 is detected by the first detection member 22 and the head portion 14 actuates the first switch member 24 by contacting the first actuating rod 240, the first rack 33 is then actuated to rotate the tool shaft 13 till the second rod 122 is detected by the second detection member 23, at this moment, the first end of the tool supporting plate 50 is located at position B. When the second rod 122 is detected by the second detection member 23, the tool shaft 13 is lowered to position C, and the second rack 34 is therefore engaged with the toothed section 130 and rotates the tool shaft 13 till the second damping means in the second rack 34 actuates a third actuating rod 350 of the third switch member 35 at position D. The tool shaft 13 is then raised to let the second rod 122 be detected by the second detection member 23 again at position B. When in position B, the first rack 33 is engaged with the toothed section 130 and rotates the tool shaft 13 till the first rod 121 is detected by the first detection member 22 again.

Accordingly, the movement of the tool supporting plate 50 moves along a path including five portions as shown in FIG. 5 and each portions of the path is proceeded at a similar speed so as to effectively avoid from any sudden stopping action.

While we have shown and described various embodiments in accordance with the present invention, it should be clear to those skilled in the art that further embodiments may be made without departing from the scope and spirit of the present invention.

What is claimed is:

1. A device for controlling a tool shaft of a cutting machine, wherein said tool shaft has a toothed section and is actuated by a cylinder, said device comprising:

a casing adapted to be mounted to said tool shaft and having a first detection member, a second detection member, a first switch member and a second switch member respectively disposed thereto, said first switch member and said second switch member located lower than said first and said second detection member;

a head portion adapted to be fixedly connected to a top of said tool shaft and adapted to be connected to said cylinder, a first rod and a second rod respectively extending from said head portion, said first rod and said second rod located corresponding to said first and said second detection member;

a first rack and a second rack respectively and disengagably adapted to be engaged with said toothed section of said tool shaft, each of said first rack and said second rack having a damping means disposed therein;

a third switch member disposed to said casing and located corresponding to said second rack;

when said first rod is detected by said first detection member and said head portion actuates said first switch member, said first rack is adapted to rotate said tool shaft till said second rod is detected by said second detection member so as to be adapted to lower said tool shaft, said second rack is therefore adapted to be engaged with and to rotate said tool shaft till said second damping means in said second rack actuates said third switch member so as to be adapted to raise said tool shaft to let said second rod be detected by said second detection member, and said first rack is be adapted to rotate said tool shaft till said first rod is detected by said first detection member again.

2. The device as claimed in claim 1, wherein said casing has a flange extending inwardly and radially from a top thereof, said first flange having a plurality of recesses defined in an inner periphery thereof and said head portion has a plurality of protrusions extending radially and outwardly therefrom which are sized to pass through said recesses.

3. The device as claimed in claim 1, wherein said first and said second rack each have a longitudinal recess defined therein, said first and said second damping means respectively and biasedly received in said respective longitudinal recesses, each of said first and said second damping means including a tubular member biasedly and movably received in said respective longitudinal recesses so that a distal end of each of said tubular members extends beyond said rack corresponding thereto and has a passage defined therethrough which communicates with said longitudinal recess corresponding thereto, each of said passages being sealed by a block which is movably and biasedly received in said longitudinal recess corresponding thereto, each of said tubular members having a tapered outer periphery so as to define a gap between said outer periphery and a periphery defining said longitudinal recess corresponding thereto.

* * * * *